J. KLEIN.
DUMPING VEHICLE.
APPLICATION FILED JULY 5, 1918.
1,314,405.
Patented Aug. 26, 1919.
3 SHEETS—SHEET 3.
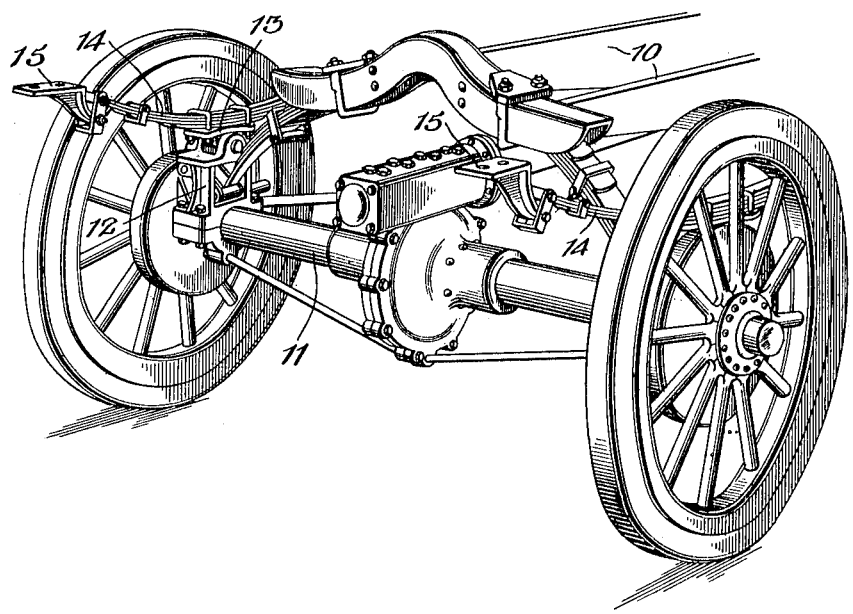
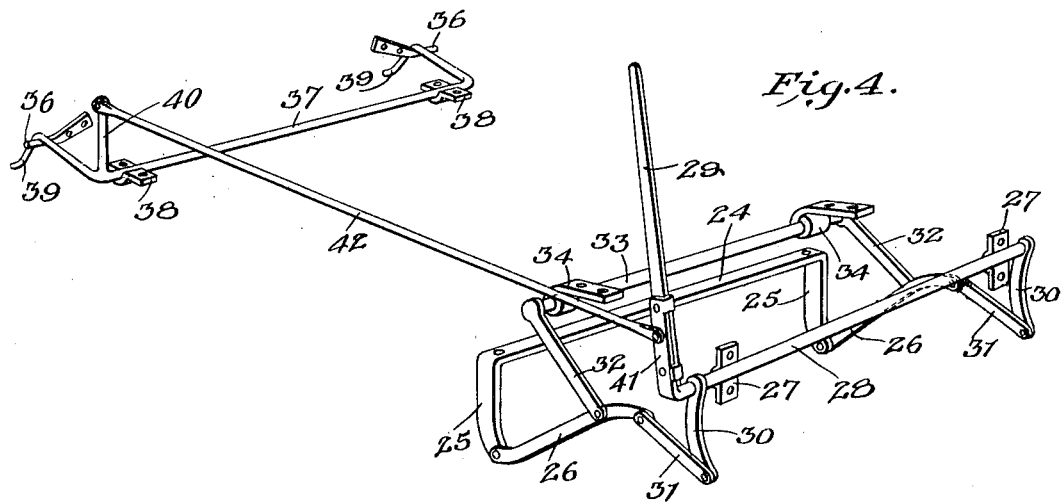
Inventor
John Klein
By Mason Fenwick Lawrence,
Attorneys

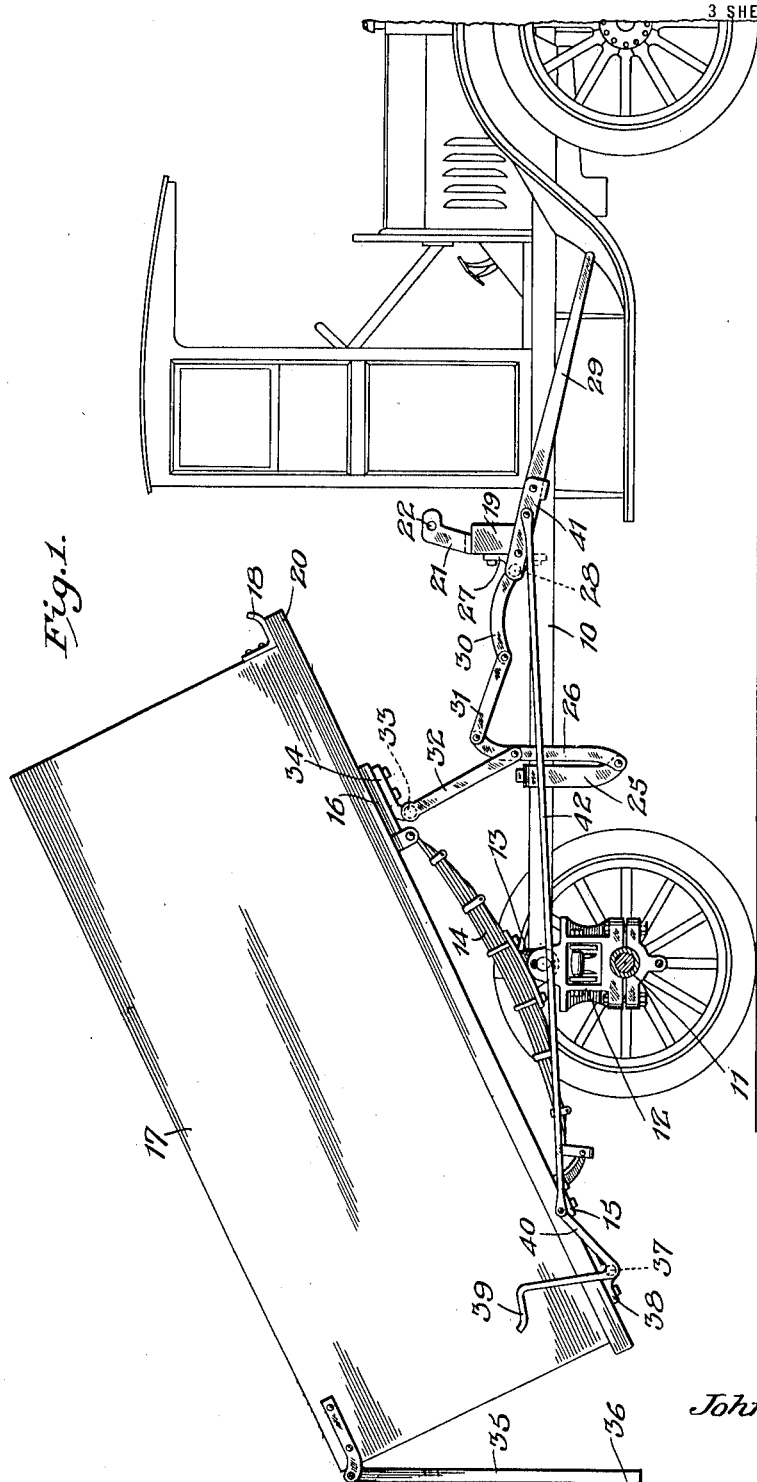

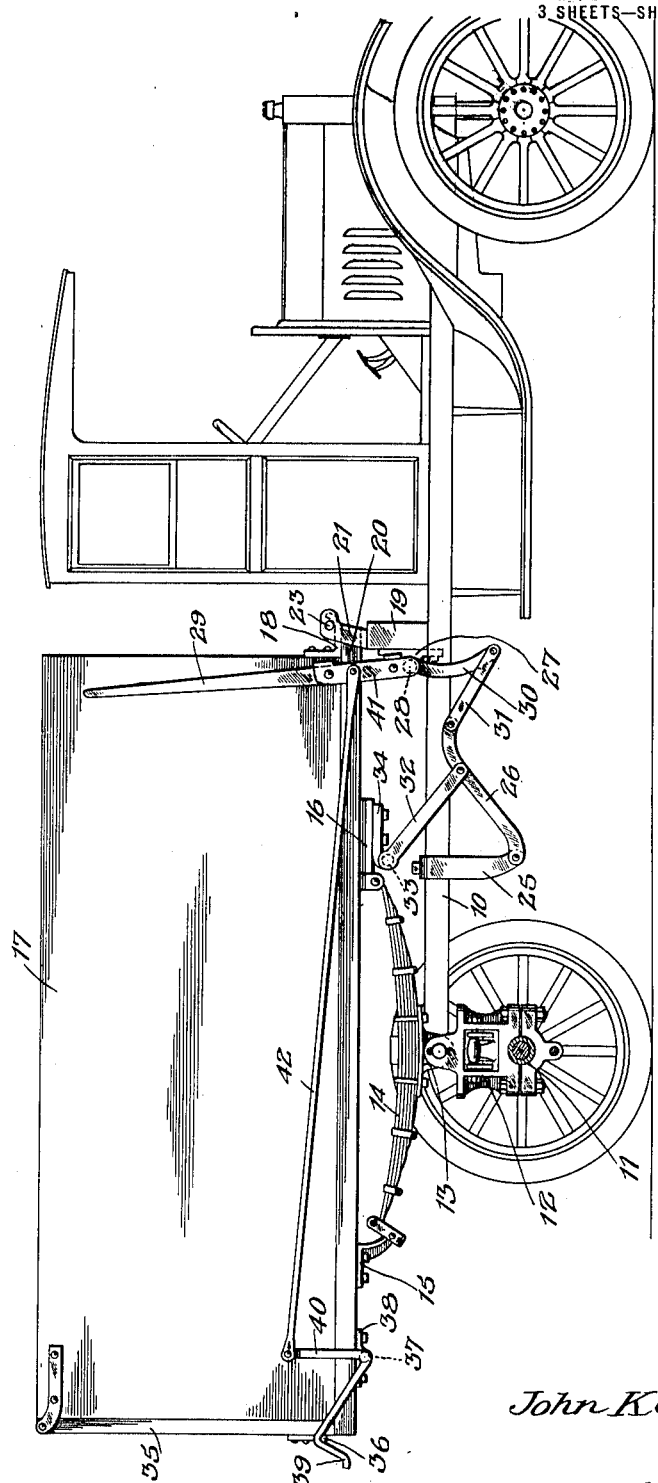

UNITED STATES PATENT OFFICE.

JOHN KLEIN, OF WASHINGTON, DISTRICT OF COLUMBIA.

DUMPING-VEHICLE.

1,314,405. Specification of Letters Patent. Patented Aug. 26, 1919.

Application filed July 5, 1918. Serial No. 243,476.

*To all whom it may concern:*

Be it known that I, JOHN KLEIN, a citizen of the United States, residing at Washington, District of Columbia, have invented certain new and useful Improvements in Dumping-Vehicles; and I do hereby declare the following to be a full, clear, and exact description of the invention, such as will enable others skilled in the art to which it appertains to make and use the same.

This invention relates to dumping vehicles and has for its object to provide improved means for tilting the body of a vehicle for dumping the contents.

A further object of the invention is to provide a body mounted upon the chassis or running gear of a vehicle with improved fulcrum means whereby the tilting of the body is facilitated.

A further object of the invention is to provide improved means for effecting the tilting of the body upon the fulcrum.

A further object of the invention is to provide improved means for fastening the end gate of the body and for releasing the fastening for accomplishing the dumping.

A further object of the invention is to provide improved means for securing the body against tilting.

With these and other objects in view the invention comprises certain novel constructions, combinations and arrangements of parts as will be hereinafter more fully described and claimed.

In the drawings,

Figure 1 is a view of a vehicle in side elevation, with one of the wheels removed showing the body in tilted or dumping position.

Fig. 2 is a view of a vehicle in side elevation with one of the wheels removed showing the body in transporting position with the body locked and the end gate locked.

Fig. 3 is a perspective view of the rear of the chassis showing the manner of mounting the body upon the chassis.

Fig. 4 is a perspective diagrammatic view of the dumping and locking mechanism unattached.

Like characters of reference indicate corresponding parts throughout the several views.

The improved dumping apparatus is intended to be applied to a truck chassis of one of the well known auto-vehicle type indicated as a whole at 10. Upon the rear axle 11 is mounted a spring support 12, which may preferably though not necessarily be of the type disclosed in Patent No. 1,268,077, of May 28, 1918. Whatever the type of spring support employed a cradle 13 is mounted pivotally thereon carrying a spring 14 upon each of such supports and as will appear adjacent to the ends of the rear axle.

The springs 14 carry at their opposite ends the supporting plates 15 and 16 upon which is mounted the body 17 of any approved type. As the body 17 is mounted directly upon the springs 14 which in turn are mounted upon the cradles 13 it is obvious that the body 17 is tiltable from the position shown at Fig. 2 to the position shown at Fig. 1. To lock the body against tilting and in transporting condition hooked members 18 are attached to the forward end of the body and a supporting member 19 placed upon the chassis in position to support the forwardly extending timbers 20 of the body. Also upon the supporting member 19 are erected guide members 21 having openings 22 therein through which may be inserted a rod 23, engaging over the hooked members 18 thereby holding the body in position shown at Fig. 2.

For the purpose of tilting the body for dumping purposes a bar 24 (see Fig. 4) is extended across the timbers of the chassis having downwardly extending end extremities 25 upon which are fulcrumed levers 26.

To the supporting member 19 are also secured bearing blocks 27 in which is journaled a rock-shaft 28 oscillated in any approved manner. Such oscillation may be effected manually by the use of a lever 29 but it is to be understood that the oscillation is not limited to the particular manual means for actuating. The rock-shaft 28 carries arms 30 which are connected by means of links 31 with the levers 26.

The levers 26 are in turn connected by means of links 32 to the body 17 preferably though not necessarily by making such links as the extremities of a rock-shaft 33 which is journaled upon the body by means of bearing clip 34.

It is obvious therefore that as the rock-shaft 28 is oscillated the parts are moved from the position as shown at Fig. 2 to the position shown at Fig. 1 whereby the body is tilted from the transporting position to the tilted or dumping position.

To retain the material within the body an end gate 35 is provided hinged adjacent to the top of the body and provided with fingers 36 adjacent to the lower edge.

Adjacent to the rear of the body 17 a rock-shaft 37 is journaled in any approved manner as by the use of the journal blocks 38 and carries at its extremities hook 39 positioned to hook over the fingers 36 when the end gate is in closed position as shown at Fig. 2.

To release the end gate simultaneously with the tilting of the body the rock-shaft 37 is provided with an arm 40 and the rock-shaft 28 with an arm 41 connected by means of a link 42, so that when the rock shaft 28 is oscillated to throw the body to tilting or dumping position the hooked arms 39 also release the fingers 36 and permit the end gate to swing open as shown at Fig. 1.

With the parts positioned as shown at Fig. 2 in transporting position to dump the body it is necessary to withdraw the locking rod 23 thereby releasing the body, and to then oscillate the rock-shaft 28. In the particular type shown in the drawings this is accomplished by the lever 29 which simultaneously tilts the body upon the cradles 13 and actuates the hooked arms 39 to release the end gate. The restoring the body to normal or transporting position is accomplished of course by the reversal of the movement.

While the running gear of the vehicle has been referred to herein and will be referred to in the claim as a chassis it is to be understood that it is not limited to the present accepted meaning of the term chassis as applied wholly to a motor vehicle but applies to the running gear of any vehicle as well.

I claim:

The combination with a chassis, of a body tiltably mounted thereon, a rock shaft mounted on said body adjacent one end thereof, a rock shaft secured to said chassis, a lever pivotally secured to said chassis, a lever secured to the rock shaft on the chassis, a link connecting said levers, a link secured to the rock shaft on the body and pivotally connected to the lever carried by the chassis, and means for oscillating the rock shaft secured to the chassis.

In testimony whereof I affix my signature.

JOHN KLEIN.